United States Patent Office 3,649,589
Patented Mar. 14, 1972

3,649,589
COATING COMPOSITIONS CONTAINING COAL TAR DISTILLATE EXTENDER RESIN AND AN EPOXY ETHER RESIN
Prentiss B. Mayfield, Woodville, Tex., assignor to Witco Chemical Corporation, New York, N.Y.
No Drawing. Filed May 1, 1970, Ser. No. 33,909
Int. Cl. C08g 51/04, 45/06
U.S. Cl. 260—37 EP                        8 Claims

ABSTRACT OF THE DISCLOSURE

Thermosetting coating compositions comprising an epoxy ether resin and a synthetic, highly aromatic polymeric extender resin, said resin being produced by subjecting a coal tar distillate fraction to conditions of elevated temperature and pressure. The compositions are especially useful as joint sealers.

---

This invention relates to novel coating compositions and more particularly to thermosetting, corrosion resistant compositions which are especially adapted for application to concrete and steel surfaces and the like. More specifically, this invention relates to epoxy ether compositions containing a coal tar distillate extender resin.

Coating compositions and corrosion resistant compositions containing epoxy ether reins and various bituminous materials, including coal tar oils and pitches, are known in the art and are disclosed, for example, in U.S. Pat. 2,765,288; 2,889,305; 2,980,601; 3,033,088; 2,976,256; 3,006,877 and 3,015,636. It should be pointed out that the coal tar pitches and oils disclosed in the aforesaid patents are distinctly different materials from the coal tar distillate extender resin employed in the compositions of the present invention. Coal tar pitch is a residual product remaining after the distillation of coal tar. Coal tar distillates are oils which are the product of the distillation of coal tar and differ substantially in composition from the extender resin, more fully described herein, employed in the compositions of the present invention which is produced by treating a coal tar distillate oil at elevated temperatures and pressures.

Epoxy coating compositions containing coal tar pitches and oils known to the prior art have suffered various deficiencies; among these, brittleness after exposure to weathering, poor corrosion resistance, relatively slow curing times and, especially, poor compatibility with epoxy ether resins. Inexpensive coating compositions containing extenders exhibiting good compatibility with the epoxy ether resins which cure to form tough, adhesive and non-bleeding thermoset films are continually sought after by those in the industry.

In accordance with the present invention, there have been discovered coating compositions comprising an epoxy ether resin, a curing agent for said epoxy ether resin and a polymeric aromatic synthetic resin, said resin being produced by treating a coal tar distillate fraction at elevated temperatures and pressures, said synthetic resin comprising from about 20% to 80% by weight of said coating composition.

The coal tar distillate resins employed in the compositions of the present invention are produced by subject a coal tar distillate fraction to temperatures in the range of about 400° F. to 1200° F. and pressures in the range of about 3 to 5 atmospheres or higher. The material produced is a synthetic, polymeric resinous substance, highly aromatic in nature and having a high degree of compatibility with epoxy ether resins. The synthetic resin is a thermoplastic solid or semisolid substance characterized as being essentially free from inorganic ash and being considerably lower in quinoline insolubles than coal tar pitch, a residual by-product of coal tar distillation. The synthetic resins employed in the compositions of the present invention generally contain less than about 1% by weight quinoline insolubles and preferably less than about 0.5%. By way of contrast, coal tar pitches generally contain in excess of 2% quinoline insolubles. The coal tar derived synthetic resins employed in the compositions of the present invention are further characterized as containing at least about 15%, and preferably, about 20% to 35% of polyphenyl aromatic compounds containing more than 20 benzene rings, resulting from the polymerization reactions occurring during the heat and pressure treatment of the coal tar distillate precursor, which will contain less than about 1% of these polymerized aromatic compounds having in excess of 20 benzene rings per molecule.

The coal tar distillates, which are treated under conditions of temperature and pressure to produce the synthetic resins employed in the compositions of the present invention, may broadly be described as those coal tar middle oil and heavy oil distillate fractions boiling in the range of about 200° C. to 500° C. Middle oil distillate fractions generally distill over the range of about 210° C. to 270° C., the major components being tar acids and bases, naphthalene and mixed methylnaphthalenes. The fraction boiling in the range of 230° C. to 270° C. is also referred to as the methylnaphthalene fraction. The higher boiling fractions resulting from the distillation of coal tar generally distill at temperatures between about 270° C. to about 500° C. and contain as principal components acenaphthene, diphenylene oxide, fluorene, phenanthrene, anthracene, carbazole, chrysene, fluoranthene, pyrene and similar compounds. These heavy oil distillate fractions are commonly referred to as light creosote (270° C.–315° C.) and heavy creosote (above 355° C.). Especially suitable and preferred for use in the coating compositions of the present invention are aromatic synthetic resins prepared from the aforesaid heavy oil coal tar distillate fractions.

In preparing the highly aromatic, polymeric synthetic resin, the coal tar distillate is placed in a suitable vessel, such as an autoclave, and maintained at a temperature of between about 400° F. to 1200° F. and a pressure between 3 to 15 atmospheres for a period of between about 5 to 25 hours. The resin produced contains a high proportion of polymerized complex aromatic compounds and is thermoplastic, solid or semisolid material. Optimum conditions for producing the resin have been found to be a temperature range of about 750° F. to 850° F., a pressure of 7 to 10 atmospheres and a treatment period of about 15 to 20 hours. These conditions are, of course, quite variable and are dependent upon the nature of the coal tar distillate fraction employed. The temperature and pressure treatments need not be conducted simultaneously; however, it is generally preferable to do so.

The epoxy ether resins suitable for use in the compositions of the present invention comprise those compounds having at least two epoxy groups, i.e., at least two

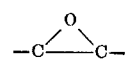

groups per molecule. The polyepoxides may be monomeric or polymeric, saturated or unsaturated, cycloaliphatic, aromatic, heterocyclic, or preferably aliphatic, and may be substituted if desired with substituents such as chlorine atoms, hydroxyl groups, ether radicals, and the like. The epoxy groups may be either present as terminal or interior groups. These polyepoxides can be conveniently referred to in terms of epoxy equivalency, i.e., the average number of epoxy groups per molecule in the polyepoxide material. Where the polyepoxide is monomeric and all of its epoxy groups are intact, its epoxy equivalency will be represented by an integer, usually 2 or greater. However, when the polyepoxide is polymeric, its epoxy equivalency will usually be represented by a fractional value of at least about 1.0 or greater, e.g., 1.5, 1.8, 2.3 and the like, since the polymer will usually contain molecules of different molecular weight and can also contain some monomeric polyepoxide or have some of its epoxy groups dehydrated or otherwise reacted.

Examples of the polyepoxides include, among others, the diacetate of epoxidized triglycerides such as epoxidized glycerol trioleate and epoxidized glycerol trilinoleate, as well as epoxidized glycerol dioleate; 1,4-bis (2,3-epoxypropoxy) benzene; 1,3-bis (2,3-epoxypropoxy) benzene; 4,4'-bis (2,3-epoxypropoxy) diphenyl ether; 1,8-bis (2,3-epoxypropoxy)-octane; 1,4-bis (2,3-epoxypropoxy) cyclohexane; 4,4'-bis (2-hydroxy-3,4-epoxybutoxy)-diphenyldimethylmethane; 1,3-bis (4,5-epoxypentoxy)-5-chlorobenzene; 1,4-bis (3,4-epoxybutoxy)-2-chlorocyclohexane; 1,3-bis (2-hydroxy-3,4-epoxybutoxy)-benzene; 1,4-bis and (2-hydroxy-4,5-epoxypentoxy) benzene and the like.

Other examples include the epoxy polyethers of polyhydric phenols obtained by reacting a polyhydric phenol with a halogen-containing epoxide in an alkaline medium. Polyhydric phenols that can be used for this purpose include, among others, resorcinol, catechol, hydroquinone, methylresorcinol, polynuclear phenols, such as 2,2-bis (4-hydroxyphenyl) propane (Bis-phenol A); 2,2-bis-(4-hydroxyphenol)-butane; 4,4'-dihydroxybenzophenone; bis (4-hydroxyphenyl)-ethane; 2,2-bis (4-hydroxyphenol)-pentane; and 1,5-dihydroxynaphthalene and the like. The halogen-containing epoxides may be further exemplified by 3-chloro-1,2-epoxybutane, 3-bromo-1, 3-epoxyhexane, 3-chloro-1, 2-epoxyoctane, and the like. Preferred polyepoxides of this type are the glycidyl polyethers of dihydric phenols produced by this method from dihydric phenols and epichlorohydrin. The monomer products of this type may be represented by the general formula:

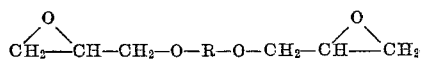

wherein R represents divalent hydrocarbon radical of the dihydric phenol. The polymeric products will generally not be a single simple molecule but will be a complex of glycidyl polyethers of the general formula:

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of material with one or both of the terminal glycidyl radicals in hydrated form.

The aforedescribed glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

These epoxy resins are available in several forms varying from a viscous liquid to a solid resin. Especially suitable are those resins which are liquid or near their softening point at room temperature.

Typical of the epoxy resins which may be employed are the epichlorohydrin-bis-phenol type sold under the trademarks "Epon Resins" (Shell Chemical Corporation). "Gen Epoxy" (General Mills). "DER Resins" (Dow Chemical Company), "Araldite" (Ciba), "ERL Resins" (Bakelite Corporation), "Epi-Rez" (Jones Dabney), and "Epiphen" (The Borden Company).

Another group of polyepoxides that can be used comprises the glycidyl ethers of novalac resins, which resins are obtained by condensing an aldehyde with a polyhydric phenol. A typical member of this class is the epoxy resin formed from formaldehyde and 2,2-bis (5-hydroxyphenol) propane novalac resin.

Another group of polyepoxides includes the glycidyl polyesters of a polyhydric phenol which has two hydroxyaryl groups separated by an aliphatic chain of at least six carbon atoms in the chain, and with the chain being attached by carbon-to-carbon bonding to a nuclear atom of the hydroxylaryl groups.

Examples of the polymeric-type polyepoxides include the polyepoxypolyhydroxy polyethers obtained by reacting, preferably in an alkaline medium, a polyhydric alcohol or polyhydric phenol with a polyepoxide, such as the reaction product of glycerol and bis(2,3-epoxypropyl) ether, the reaction product of sorbitol and bis (2,3-epoxy-2 methylpropyl) ether, the reaction product of pentaerythritol and 1,2-epoxy-4,5-epoxypentane, and the reaction product of bis-phenol and bis (2,3-epoxy-2-methylpropyl) ether, the reaction product of resorcinol and bis (2,3-epoxypropyl) ether, and the reaction product of catechol and bis (2-,3-epoxypropyl) ether.

Other polyepoxide compounds include the polymers and copolymers of the epoxy-containing monomers possessing at least one polymerizable ethylenic linkage. Illustrative examples of these polymers include poly (allyl-2,3-epoxypropyl ether), poly (2,3-epoxypropyl crotonate), allyl 2,3-epoxypropyl etherstyrene copolymer, methallyl 3,4-epoxybutyl etherallyl benzoate copolymer, poly (vinyl 2,3-epoxypropyl ether), allyl glycidyl ether-vinyl acetate copolymer and poly (4-glycidyloxy-styrene).

Another group of polyepoxides includes the epoxy esters of polybasic acids, such as diglycidyl phthalate and diglycidyl adipate, diglycidyl tetrahydrophthalate, diglycidyl maleate, and the like, and the glycidyl esters of polymerized unsaturated fatty acids, such as dimerized and trimerized fatty acids obtained by heat polymerization, as exemplified by dimerized and trimerized linoleic acid, oleic acid and eleostearic acid. Particularly preferred members of the above described groups comprise the polymers of the 2-alkenyl glycidyl ethers having a molecular weight between 300 and 1000 and an epoxy equivalency greater than 1.0 and preferably between 1.2 and 6.0.

Other polyepoxides include the polyepoxy polyethers comprising ethers of epoxy alcohols and polyhydric alcohols such as obtained by reacting, preferably in the presence of an acid-acting compound such as hydrofluoric acid, polyhydric alcohols with epichlorohydrin or dichlorohydrins and then dehydrochlorinating the resulting product in the presence of an alkaline component. Examples of polyhydric alcohols that may be used for this purpose include, among others, 1,2,6-hexanetriol, 1,5-pentanediol, butylene glycol, glycerol, sorbitol, mannitol, pentaerythritol, polyallyl alcohol, polyvinyl alcohol, trimethylolpropane, bis (4-hydroxycyclohexyl) dimethylmethane, 1,4-dimethylolbenzene, and the like. Particularly preferred members of this group comprise the glycidyl polyethers of aliphatic polyhydric alcohols containing from 2 to 10 carbon atoms and having from 2 to 6 hydroxyl groups and more, preferably the alkane polyols containing from 2 to 8 carbon atoms and having from 2 to 6 hydroxyl groups. Such products preferably have an epoxy equivalency greater than 1.0, and still more preferably between 1.1 and 4 and a molecular weight between 300 and 1000.

As cross-linking or curing compounds for the coal tar distillate resin extended epoxy resin compositions of the present invention, amine type or polyfunctional amines have been found to be particularly useful. By the term polyfunctional amines as used herein is meant organic compounds having at least one nitrogen atom and at least two active amino hydrogen atoms which can be on the same or different nitrogen atoms. Curable mixtures can be formed from the extended epoxy resin compositions and polyfunctional amines at temperatures in the 20° C. to 30° C. range, and higher if desired. Temperatures above 20° C. can be used when higher curing rates are desired or for any other purpose.

Typical amines and polyfunctional amines suitable as epoxy resin composition curing agents include the aliphatic primary amines, such as ethylamine, isopropylamine, n-butylamine, isobutylamine, 2-ethylhexylamine, monoethanolamine, monoisopropanolamine, beta-alanine, cyclohexylamine; amides; e.g., formamide, acetamide, propionamide, n-butyramide, stearamide, and the like; aromatic primary amines such as aniline, alpha-methylbenzylamine, and the like; heterocyclic primary amines, such as N-aminoethyl morpholine; the aliphatic polyamines, such as ethylenediamine, diethylenetriamine, triethylenetriamine, tetraethylenepentamine, polyethylenepolyamines, propylenediamine, dipropylenetriamine, polypropylenepolyamines, butylenediamines, pentylenediamines, hexylenediamines, octylenediamines, nonylenediamines, decylenediamines, dimethylurea, 1,3-diamino-2-propanol, 3,3'-imino-bis-(propylamine), guanidine, and the like; aromatic polyamines, such as meta-ortho- and para-phenylenediamines, 1,4-naphthalenediamine, 1,4-anthracenediamine, 3,3'-biphenyldiamine, xylylenediamine, 3,4-biphenylamine, 3,4-toluenediamine, alpha, alpha'-biparatoluidine, para, para' methylenedianiline, 1-methoxy-6-methyl meta-phenylenediamine, para, para'-sulfonyldiamine, and the like; and heterocyclic polyamines, such as piperazine, 2,5-dimethylpiperazine, melamine, 2,4-diamine-5-(aminomethyl) pyrimidine, 2,4,6-triaminopyrimidine, 3,9-bis(aminoethyl) apirobi-metadioxane, and the like.

Other polyfunctional amines include the low molecular weight polyamides, which are condensation products of polycarboxylic acids, in particular, hydrocarbon dicarboxylic acids, with polyamines, particularly, diamines, such as those monomeric diamines previously listed. Typical polyamides are prepared in accordance with known condensation procedures from adipic acid and hexamethylene diamine, dilinoleic acid and ethylenediamine, terephthalic acid and diethylenetriamine and the like.

Still other illustrations of polyfunctional amines are the addition products or adducts of polyamines, in particular diamines and triamines, and low molecular weight epoxides containing oxirane oxygen linked to vicinal carbon atoms, such as ethylene oxide, propylene oxide, butadiene dioxide, diglycidyl ether, epoxidized soybean oil, epoxidized safflower oil and the like, and polyglycidyl polyethers of polyhydric phenols. Particularly useful polyfunctional amines are the mono- and polyhydroxyalkyl polyalkylene polyamines which can be prepared by the addition reaction of polyalkylene polyamines, preferably ethylenediamine, propylenediamine, diethylenetriamine, dipropylenetriamine or triethylenetetramine and the like, with ethylene oxide or propylene oxide.

Additional polyfunctional amines include the low molecular weight addition products of a polyamine, preferably a polyalkylene polyamine such as those listed above, and a vinyl group-containing compound. Typical vinyl group-containing compounds are, for example, ethylene, propylene, 1-butene, isobutene, acrolein, vinyl chloride, vinylidene chloride, vinyl acetate, acrylonitrile, styrene and the like. These polyfunctional amines or vinyl polyamine adducts can be prepared in accordance with known procedures by reacting a polyamine and a vinyl group-containing compound in various proportions at a temperature in the range from 20° C. to 100° C. and removing unreacted materials and low boiling materials by vacuum distillation.

Other suitable curing agents for use in the compositions of the present invention include the dibasic acid anhydrides such as phthalic anhydride, maleic anhydride or succinic anhydride; carboxylic acids such as formic or oxalic acids, dimer and trimer acids derived from unsaturated fatty acids and the like; $BF_3$ complexes such as boron-fluoride-diethyl ether complex and boron-fluoride-phenol complex; Friedel-Crafts metal halides such as aluminum chloride, zinc chloride and ferric chloride; salts such as zinc fluoborate, magnesium perchlorate and zinc fluosilicate; phosphoric acid and partial esters thereof.

The compositions of the present invention are cured by the action of the curing agent and, in general, the amount of said curing agent employed is dependent upon the type of agent selected. In general, the amount of curing agent will vary from about 0.5% to 200% by weight of the polyepoxide. The tertiary amines and $BF_3$ complexes are preferably employed in amounts varying from about 0.5% to 20% and the metal salts are preferably employed in amounts varying from about 1% to 15%. The primary and secondary amines, acids and anhydrides are preferably employed in at least stoichiometric amounts, i.e., a sufficient amount to furnish one amine hydrogen or one carboxyl group or anhydride group for every epoxy group, and more preferably, stoichiometric ratios varying from 1:1 to 1:5.

The quantity of epoxy ether resin admixed with the coal tar distillate synthetic resin can be widely varied. Thus, compositions of the present invention may comprise from 20% to 80% by weight of said coal tar distillate synthetic resin based on the combined weight of epoxy ether resin and coal tar distillate resin. Preferably there will be present about 40% to 60% by weight coal tar distillate synthetic resin and 60% to 40% by weight epoxy ether resin based on the combined weight of the aforesaid. The materials are blended by conventional techniques. Use of quantities substantially in excess of or below the aforesaid range of about 20% to 80% synthetic resin will, generally, result in a loss of flexibility, corrosion resistance and uniformity of the composition formed upon curing.

Numerous other ingredients may be added to the compositions of the present invention in order to impart desired properties to the coating compositions, such as, for example, organic solvents or diluents, inorganic mineral fillers, reinforcing agents and thixotropic agents. The organic solvents or diluents include aliphatic and aromatic hydrocarbon materials such as naphtha, creosote oil, butanol, xylol, toluol and the like which may be added to alter the viscosity to whatever consistency is desired. Among the various inorganic mineral fillers, reinforcing agents and thixotropic agents which may be added to the compositions of the present invention, and which are advantageously and preferably employed, are mica, aluminum silicate, magnesium silicate in its various forms, such as talc, diatomaceous earth, clays such as kaolin, bentonite or fuller's earth and the like. Exemplary thixotropic agents are colloidal silica, such as "Cabosil," and the quaternary ammonium clays such as Bentone 34 (dimethyl dioctadecyl ammonium bentonite) and Bentone 38. The thixotropic agent is employed in amounts less than about 5% by weight of the overall composition and preferably in the area of about 1%. The inorganic mineral fillers may be employed in proportions ranging up to about 35% to 40% by weight and preferably in the range of about 20% to 30% by weight. Preferably a magnesium silicate filler, such as talc, will be employed.

The following examples are illustrative of the practice of the present invention but are not to be considered as limitative of its scope. Percentages and parts listed are by weight.

EXAMPLE 1

A coal tar distillate resin is prepared by treating a coal tar distillate fraction for a period of 16½ hours at a temperature of 710°–720° F. and a pressure of 8 atmospheres.

The highly aromatic resin produced has the following properties:

| | |
|---|---|
| Float at 50° C., seconds | 203 |
| Specific gravity 60°/60° F. | 1.223 |
| Quinoline insolubles _____ percent | 0.13 |
| Softening point (R & B) _____ ° F | 88 |
| Distillation (ASTM D20–55): | |
|     Weight percent to 300° C. | 1.04 |
|     Weight percent to 360° C. | 31.10 |
|     Weight percent to 400° C. | 50.03 |

To 100 parts (46.4%) of the resin so produced is added 100 parts (46.4%) of a liquid epoxy resin (epichlorohydrindihydric phenol) having a viscosity of 16,000–20,000 cps. at 25° C. and an epoxide equivalent (grams of resin containing one gram-equivalent of epoxide) of 192–208. The resin is warmed to a temperature in excess of its softening point prior to addition of the epoxy resin. To this admixture is added 16 parts (7.2%) of a curing agent consisting of diethylene triamine (60%) and p,p'-isopropylidenediphenol (40%). The composition gels within 30 minutes and cures to a tough thermoset material after about two hours. Visual observations during preparation and curing indicate excellent compatibility of the coal tar distillate resin and epoxy resin.

EXAMPLE 2

(a) Example 1 is repeated except that there is employed 50 parts synthetic resin and related results are obtained.

(b) Example 2(a) is repeated, except that the epoxy resin employed is prepared from allyl glycidyl ether and ditertiarybutyl peroxide and has an epoxy value of 0.50 eq./100 g., a viscosity of 15 poises and a molecular weight of 481–543 and the curing agent is 8 parts of diethylene triamine. Equivalent results are obtained.

EXAMPLE 3

The following composition is prepared by admixing components A and B and cures within about 20 hours. It is especially suitable for use as a metal coating composition, such as for pipeline protective coatings.

| | Percent |
|---|---|
| Component A: | |
|   Resin of Example 1 | 34.5 |
|   Epoxy resin—liquid epichlorohydrin dihydric phenol product having a viscosity of 4.1–9.7 poises at 25° C. and an epoxide equivalent of 230–280 | 22.9 |
|   Xylol | 6.1 |
|   2-butanol | 6.1 |
|   Talc pigment | 23.6 |
|   Silica thixotropic agent | 1.0 |
| Component B: | |
|   Diethylene triamine | 2.9 |
|   2-butanol | 2.9 |

EXAMPLE 4

In the following compositions the resin employed is produced by treating a coal tar distillate fraction for a period of about 18 hours at a temperature of 690°–700° F. and a pressure of about 9 atmospheres. The resin produced has the following properties:

| | |
|---|---|
| Softening point (cube-in-air method) _____ ° C | 77.8 |
| Sp. Gr. 25/25° C. | 1.258 |
| Quinoline insolubles _____ percent | 0.33 |
| Viscosity-Brookfield: | |
|   1 poise _____ ° F | 301 |
|   10 poises _____ ° F | 262 |
|   100 poises _____ ° F | 211 |
| Distillation (ASTM D20–55): | |
|   Weight percent to 360° C. _____ percent | 2.96 |
|   Weight percent to 400° C. _____ percent | 28.33 |

The following composition is prepared and applied to a carbon steel panel. It cures to a tough, glossy thermoset coating within about 20 hours. The coating exhibits excellent flexibility at temperatures below 32° F.

| | Percent |
|---|---|
| Component A: | |
|   Resin | 27.5 |
|   Polyamide—condensation product of polymerized fatty acid and polyamine amine value=330–360 | 9.1 |
|   Viscosity 80–120 poises at 40° C. magnesium silicate | 24.4 |
|   Xylol | 15.7 |
|   Ethanol | 0.8 |
|   Colloidal silica (thixotropic agent) | 1.2 |
|   Tris-(dimethylaminomethyl) phenol | 1.0 |
| Component B: | |
|   Epoxy resin—light medium viscosity epichlorohydrin-dihydric phenol resin; viscosity=12–16,000 cps. at 25° C., epoxide equivalent=182–196 | 20.3 |

This example indicates that the epoxy resin may be added as the last component to an admixture of the extender resin, curing agents and other components.

EXAMPLE 5

A resin is produced by treating a coal tar distillate at a temperature of 800° F. for a period of 16½ hours and at a pressure of 7–8 atmospheres. The resin has the following properties:

| | |
|---|---|
| Float at 32° C. _____ seconds | 219 |
| Sp. gr. 60/60° F. | 1.207 |
| Quinoline insolubles _____ percent | 0.0 |
| Distillation (ASTM D20–55) | |
|   Weight percent to 300° C. _____ percent | 0.6 |
|   Weight percent to 360° C. _____ percent | 25.9 |
|   Weight percent to 400° C. _____ percent | 50.2 |

The resin of this example is considered particularly preferable for preparing the epoxy resin compositions of the present invention. Utilizing the coal tar distillate resin described above, the following composition is prepared and cured within about 15 hours to a glossy, thermoset coating composition.

| | Percent |
|---|---|
| Component A: | |
|   Resin | 34.7 |
|   Epoxy resin (90% solution of high viscosity epichlorohydrin-dihydric phenol epoxy resin in xylol: 250–300 | |
|   Epoxide equivalent | 25.6 |
|   Magnesium silicate | 23.3 |
|   Colloidal silica | 1.0 |
|   o-Dichlorobenzene | 5.6 |
|   Isobutyl alcohol | 6.0 |
| Component B: | |
|   Diethylene triamine | 1.9 |
|   Butyl alcohol | 1.9 |

The initial viscosity of Component A is 5,300 cps. (Brookfield at 77° F. No. 5 spindle, 20 r.p.m.). After a period of 7 days it is measured at 5,300 cps. and after 4 weeks it remains at 5,300 cps. This viscosity stability is an important characteristic from a commercial standpoint when contrasted, for example, with coal tar pitch-epoxy compositions which are known to have self-curing properties and which cannot be stored for substantial periods prior to use.

EXAMPLE 6

A composition is prepared from 250 parts of the synthetic resin of Example 5; 100 parts of a polyglycidyl ether viscous liquid epoxy resin prepared from glycerol and epichlorohydrin having an epoxy equivalency of 2.13 and a molecular weight of 324 and 8 parts diethylene triamine curing agent. The composition is applied to a steel surface and cures within about 25 hours to a tough, glossy thermoset coating composition.

EXAMPLE 7

Example 6 is repeated except that the epoxy resin employed is a liquid having an epoxy value of 0.23 eq./100 grams prepared by reacting dimerized linoleic acid and epichlorohydrin in the presence of potassium hydroxide.

The novel compositions of the present invention offer a number of distinct advantages, especially when compared with heretofore known coal tar and coal tar distillate extenders such as are disclosed in U.S. Pats. Nos. 2,765,288 and 2,889,305. More specifically, the compositions described herein exhibit excellent low temperature flexibility. A carbon steel panel coated with illustrative coal tar distillate resin-epoxy compositions of the present invention can be bent a full 90° at room temperature without any splitting or breaking observable in the coating. Also batches prepared are consistently uniform; the composition is easier to apply than, for example, a coal tar extended composition, and the finished product shows a smooth and glossy finish which is highly desirable from a practical commercial standpoint. The compositions of the present invention also offer excellent resistance to the harmful and corroding effects of extreme weather conditions. In addition, the compositions of the present invention possess excellent viscosity stability. More particularly, it has been observed that, prior to curing, admixtures of epoxy resin and coal tar distillate resin may be stored for a period of several weeks, or even months, with no noticeable change in viscosity. This is of importance with regard to manufacturing, storage and transport of the coating compositions, and is of considerable commercial significance, especially in light of the fact that conventional coal tar pitch epoxy mixtures, prior to curing, undergo significant changes in viscosity within a few days.

The coating compositions of the present invention have a wide variety of uses and may be applied to steel, stainless steel, cast or wrought iron, brick, stone and concrete surfaces. They are particularly useful as protective coatings for oil and gas transmission lines, sewerage lines, settling basins, crude oil and petroleum products storage tanks, in marine equipment for barges, steel structures such as platforms, drilling rigs, tanks and piping, and other equipment which is exposed to the corroding effect of weather and salt water.

What is claimed is:
1. A coating composition comprising the cured product of an epoxy ether resin having an epoxy equivalency greater than 1, a curing agent for said epoxy ether resin, and a polymeric, highly aromatic synthetic resin, said resin being produced by subjecting a coal tar distillate fracation being a member selected from the group consisting of middle oil and heavy oil distillate fractions to temperatures from about 400° F. to 1200° F., and pressures in the range of about 3 to 15 atmospheres for a period of between about 5 and 25 hours, said synthetic resin being present in an amount of from about 20% to 80%, by weight, based on the combined weight of said synthetic resin and said epoxy ether resin.
2. A composition according to claim 1 wherein said polymeric, highly aromatic synthetic resin is produced by treating a coal tar distillate fraction at a temperature of from about 750° F. to 850° F. and a pressure of from about 7 to 10 atmospheres for a period of about 15 to 20 hours.
3. A composition according to claim 1 wherein said polymeric, highly aromatic synthetic resin is further characterized as containing less than about 1% by weight quinoline insolubles.
4. A composition according to claim 1 wherein said epoxy ether resin curing agent is a polyfunctional amine curing agent.
5. A composition according to claim 1 wherein said epoxy ether resin is a glycidyl polyether of a dihydric phenol.
6. A composition according to claim 1 wherein there is present a minor proportion of an inert mineral filler.
7. A composition according to claim 6 wherein said filler is a magnesium silicate.
8. A composition according to claim 1 containing up to about 5% by weight of a thixotropic agent.

References Cited
UNITED STATES PATENTS 3,284,390  11/1966  Scheibli et al. __ 260—37 EP X
3,417,678  12/1968  Ewers _____ 260—37 EP X L. T. JACOBS, Primary Examiner U.S. Cl. X.R.
260—37 R, 830 R